United States Patent [19]

Futrell

[11] Patent Number: 4,967,960
[45] Date of Patent: Nov. 6, 1990

[54] VEHICLE WASH SYSTEM

[76] Inventor: Edgar V. Futrell, 250 W. Parliament Pl., Mt. Prospect, Ill. 60056

[21] Appl. No.: 213,532

[22] Filed: Jun. 30, 1988

[51] Int. Cl.$^5$ .............................................. B05B 9/03
[52] U.S. Cl. ............................... 239/148; 239/175;
  239/305; 239/307; 239/310; 239/332
[58] Field of Search ............... 239/148, 172, 175, 303,
  239/304, 305, 307, 310, 332, 302

[56] References Cited

U.S. PATENT DOCUMENTS

| | | | |
|---|---|---|---|
| 2,309,247 | 1/1943 | Johnson | 239/307 |
| 3,037,707 | 6/1962 | Ligon | 239/310 |
| 3,227,524 | 1/1966 | White | 239/302 |
| 3,317,142 | 5/1967 | Casale | 239/305 |
| 3,454,042 | 7/1969 | Phillips | 239/302 |
| 3,456,848 | 7/1969 | Shaffer et al. | 239/172 |
| 3,575,348 | 4/1971 | MacKay | 239/310 |
| 3,612,356 | 10/1971 | McVey | 239/310 |
| 3,797,744 | 3/1974 | Smith | 239/305 |
| 4,006,703 | 2/1977 | Smith | 239/335 |

FOREIGN PATENT DOCUMENTS

1442828  5/1966  France .......................... 239/305

*Primary Examiner*—Andres Kashnikow
*Assistant Examiner*—Michael J. Forman
*Attorney, Agent, or Firm*—Laff, Whitesel, Conte & Saret

[57] ABSTRACT

This invention relates to a mobile system for washing vehicles which supplies water at high pressure through a discharge hose to a user-operated spray gun or wand. The mobile washing system contains means to receive water at low pressure from the municipal or domestic well water supply. There is an engine and pump that pressurizes the water received; an onboard sdelf regenerating water softening unit to remove impurities from the wash and rinse water so that washed vehicles may dry virtually spot-free without manual drying; reservoirs for storing a liquid cleaning agent and a liquid wax which can be introduced into the discharge stream under operator control to eliminate the need to manually apply soap or wax; and valves and controls to effectively operate the wash system. All components are mounted on a wheeled cart which can be easily rolled from vehicle to vehicle by the operator or rolled to a convenient washing location. The water softening system is such that is may be regenerated by the user as required, eliminating both the expense of returning the mineral tank to the manufacturer and the frequent, lengthly periods of unavailability.

3 Claims, 7 Drawing Sheets

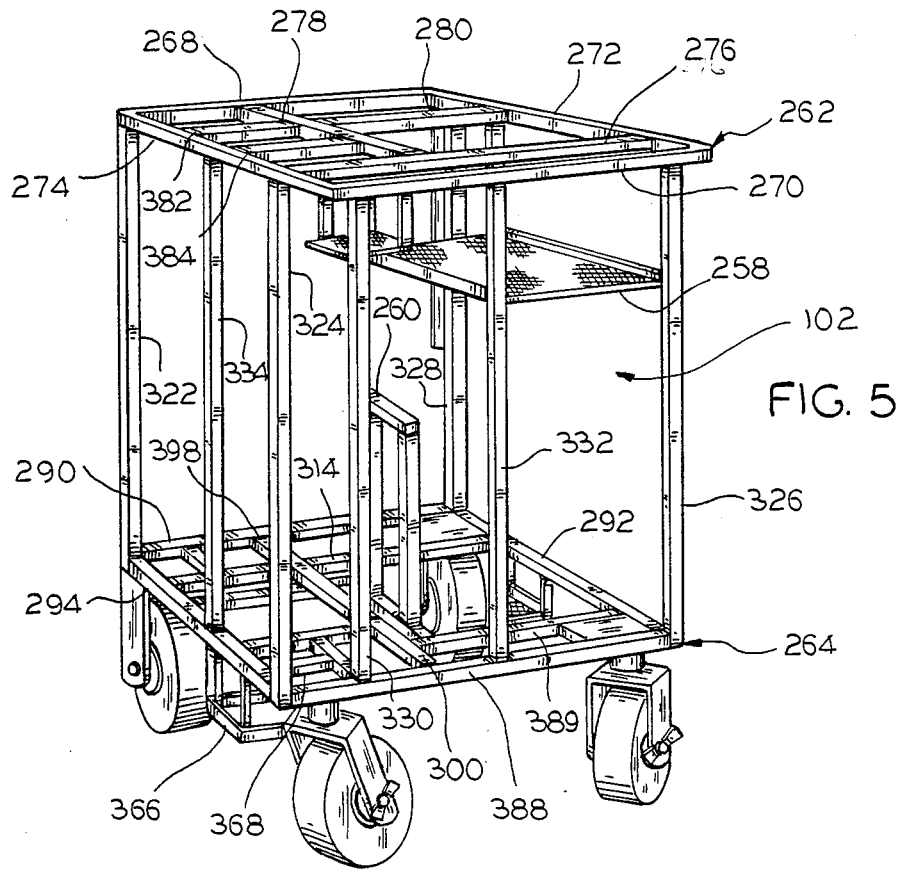
FIG. 5
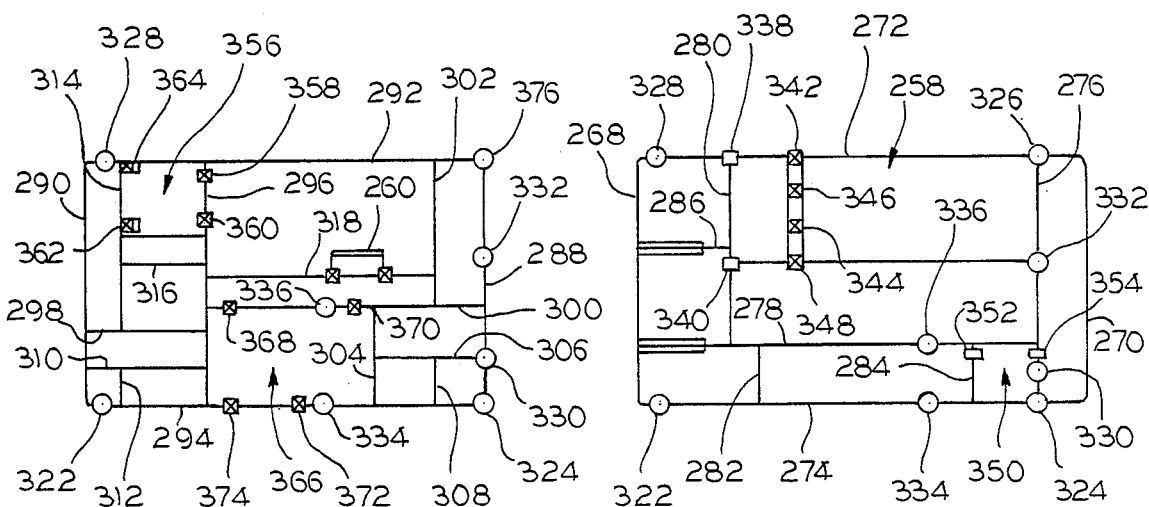
FIG. 6
FIG. 7

VEHICLE WASH SYSTEM

The present invention relates to a new and improved mobile self-contained vehicle washer which has a self-regenerating water softener system.

BACKGROUND ART

Several industries share the requirement for a cost- and time-efficient way to wash motor vehicles. New and used automobile dealers and car rental agencies appeal to appearance-sensitive customers, and often must wash every car in inventory after each rain. Truck operators must keep their vehicles clean to comply with state and local regulations. Car and van fleet operators must maintain an acceptable appearance to the public on a continuous basis. Hand washing such vehicles is labor intensive and otherwise expensive.

Prior art solutions to this need are costly in both time and money. One solution is to move each vehicle to a commercial washing facility when necessary. These facilities often charge substantial fees, especially for large trucks. In addition to the fee charged by the washing facility, the user must also bear the expense of a driver to move the vehicle, including the loss of his services to perform other functions. This method also produces logistical problems in that vehicles must be properly staged and sequenced when dense parking schemes do not provide aisle access for every vehicle.

Larger businesses have approached this problem by building their own washing facility. The large capital expenditures required make this solution infeasible for smaller businesses, and are often economically unjustifiable for even the large operators. In addition, a driver is still needed to move the vehicles between their parking places and the washing facility.

Another solution attempted in the past has been to supply water at high pressure through a hose from a centrally located pump. One disadvantage of this method is that impurities in the water leave streaks and spots when the vehicle is air dried. Hand drying the vehicle to avoid spots is time consuming and labor-intensive. Another disadvantage is that long runs of high-pressure hose are expensive and failure-prone.

To combat these difficulties, mobile wash systems have appeared in the prior art. These generally receive water at low pressure through a hose and use a power plant and pump to supply water at high pressure through a discharge hose. The user must still manually apply soap and wax and must manually dry the vehicle to avoid spotting.

Some of these systems have included a water softening mineral tank to remove spot-causing impurities from the water. The mineral tank's ability to soften water is limited; when the softening ability is exhausted, the tank must be "regenerated" by its manufacturer. One problem with this system is that the manufacturer charges a substantial fee for regenerating the tank, which makes the prior art system's cost of operation high. Another problem is that the system is unavailable for use from time the tank is exhausted until the manufacturer returns with another regenerated tank. Also, these systems do not have a convenient means for prerinsing, soaping or washing, waxing, and virtually spot free rinsing.

In summary, for large fleets of vehicles, washing by hand, use of a commercial washing facility, or building a dedicated washing facility are each prohibitively expensive. Centrally supplied hoses and most mobile wash systems leave spots or require costly hand drying. Mobile systems which remove impurities for virtually spot-free drying have high continuous operating expenses and frequent, unacceptable periods of unavailability and are not essentially self-contained vehicle washing units.

DISCLOSURE OF INVENTION

It is therefore an object of this invention to provide a mobile, essentially self-contained, vehicle wash system which permits rapid cleaning of vehicles at low initial and operating costs by eliminating most labor-intensive operations including long distance movement of the vehicle, manual application of soap and wax, and manual drying.

It is a further object of this invention to provide a mobile, essentially self-contained, vehicle wash system which supplies impurity-free water for virtually spotless drying but eliminates the need for frequent, expensive factory refurbishment and lengthy periods of unavailability.

It is still another object of the present invention to provide a mobile cart that can be used to mount and transport vehicle cleaning devices.

This invention relates to a mobile system for washing vehicles which supplies water at high pressure through a discharge hose to a user-operated spray gun or wand. The mobile washing system contains means to receive water at low pressure from the municipal or domestic well water supply. There is an engine and pump that pressurizes the water received; an onboard self regenerating water softening unit to remove impurities from the wash and rinse water so that washed vehicles may dry virtually spot-free without manual drying; reservoirs for storing a liquid cleaning agent and a liquid wax which can be introduced into the discharge stream under operator control to eliminate the need to manually apply soap or wax; and valves and controls to effectively operate the wash system. All components are mounted on a wheeled cart which can be easily rolled from vehicle to vehicle by the operator or rolled to a convenient washing location. The water softening system is such that it may be regenerated by the user as required, eliminating both the expense of returning the mineral tank to the manufacturer and the frequent, lengthy periods of unavailability.

A more detailed description of the invention is hereinafter set forth. However, this detailed description is not intended to limit my invention but is intended only to describe a specific embodiment thereof.

BRIEF DESCRIPTION OF DRAWINGS

FIG. 1A is a top view only of a control of the wash system of the present invention.

FIG. 5 is a perspective view of the wash system cart of the present invention.

FIG. 6 is a top plan schematic view of the layout of the bottom of the cart of FIG. 5.

FIG. 7 is a top plan schematic view of the layout of the top of the cart of FIG. 5.

DETAILED DESCRIPTION OF DRAWINGS

Figure 1:
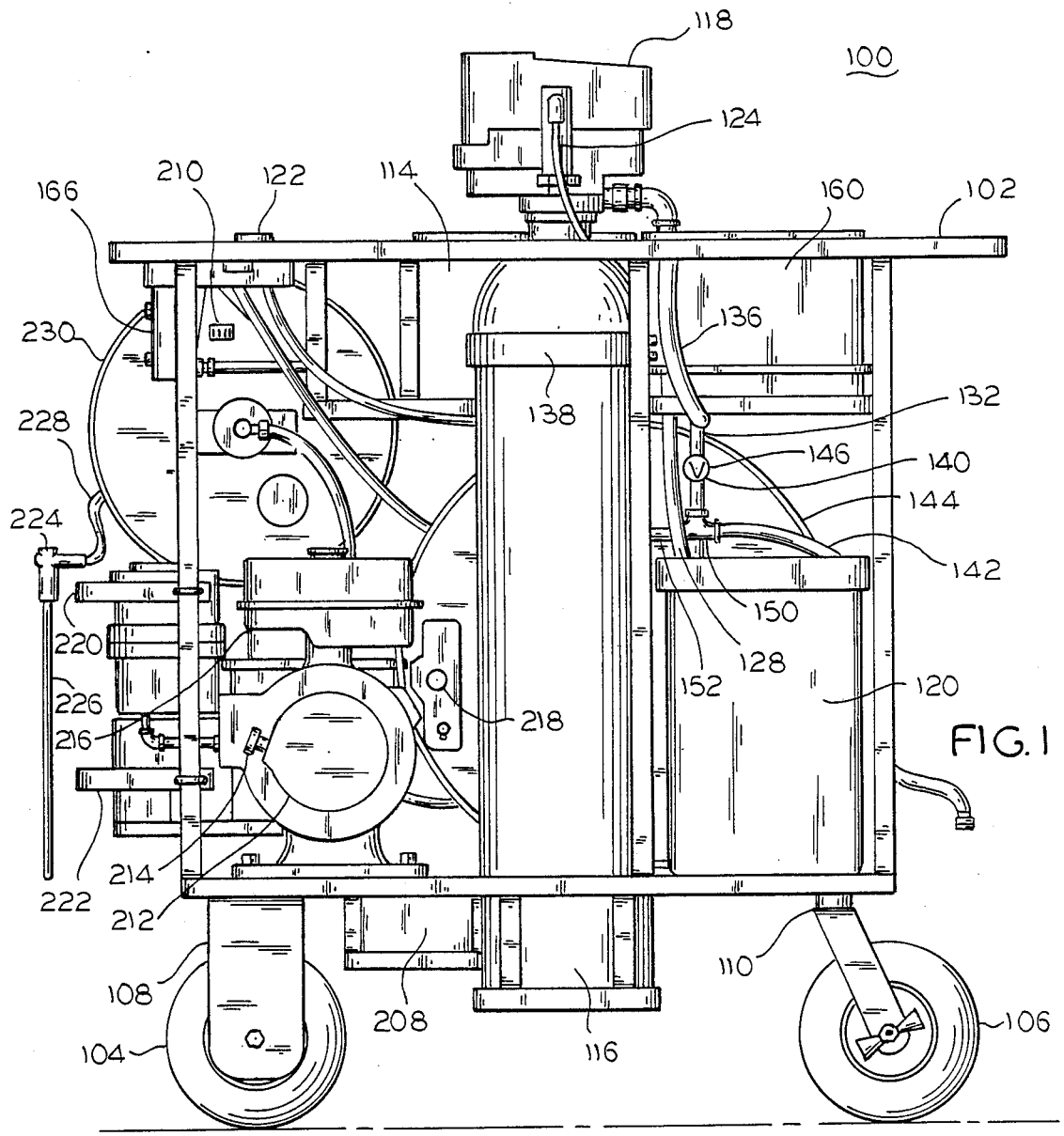
FIG. 1 is a side elevational view of the washing system of the present invention.

In FIG. 1, there is shown a car wash system 100. The car wash system 100 has a wheeled cart 102. The wheeled cart 102 has a pair of rear tires 104 and a pair of front tires 106. The tires are preferably pneumatic tires. The rear tires are each mounted for rotation and connected to the lower frame of the cart by a respective pair of stationary mounts 108. The front tires are connected to the lower frame of the cart at the front end by a respective pair of swivel mounts 110. The front swivel mounts 110 each have an appropriate tension brake means that is actuated to the on and off position by the respective wing actuators 112.

Mounted on the cart is a self-generating water softener system 114 that provides demineralized water. The water softening system includes a mineral tank 116, a timer and valve unit 118 and a brine tank 120 and an elapse time indicator 122. A tube 124 connects the brine tank 116 with the valve unit 118.

The water softening unit 114 supplies demineralized water for washing and rinsing vehicles. As stated above surfaces washed and rinsed with demineralized water dry virtually streak and spot-free when exposed to air. This permits vehicles to be washed without requiring the operator to hand-dry the Vehicle, thus eliminating a time-consuming and labor-intensive step. The water softener is a self regenerating water softener and is similar to those used in homes to treat domestic water supplies. The mineral tank 116 performs the actual softening operation. Unsoftened water enters the tank 116, certain undesired impurities are removed, and the resultant treated water is discharged.

After a certain period of time, the ability of the mineral tank 116 to remove impurities is exhausted, and the tank 116 must be "regenerated" to permit further softening. The elapsed time indicator 122 displays the amount of time the softener 114 has operated, and allows the operator to conveniently determine when the regeneration process must occur. The brine reservoir 120 supplies brine, a saturated solution of salt in water, for use in the regeneration process. The operator loads the brine reservoir 120 with a predetermined amount of solid or granular salt. The water softener unit 114 introduces a measured amount of water into the reservoir 120. Salt dissolves into the water until the solution is saturated (i.e. the water cannot accept any additional salt). During the regeneration process, the brine thus formed is passed through the mineral tank 116 preparing it to again remove impurities from unsoftened water. The regeneration process is controlled by a timer and valve unit 118 which operates from a standard 117 VAC power supply.

Figure 4:
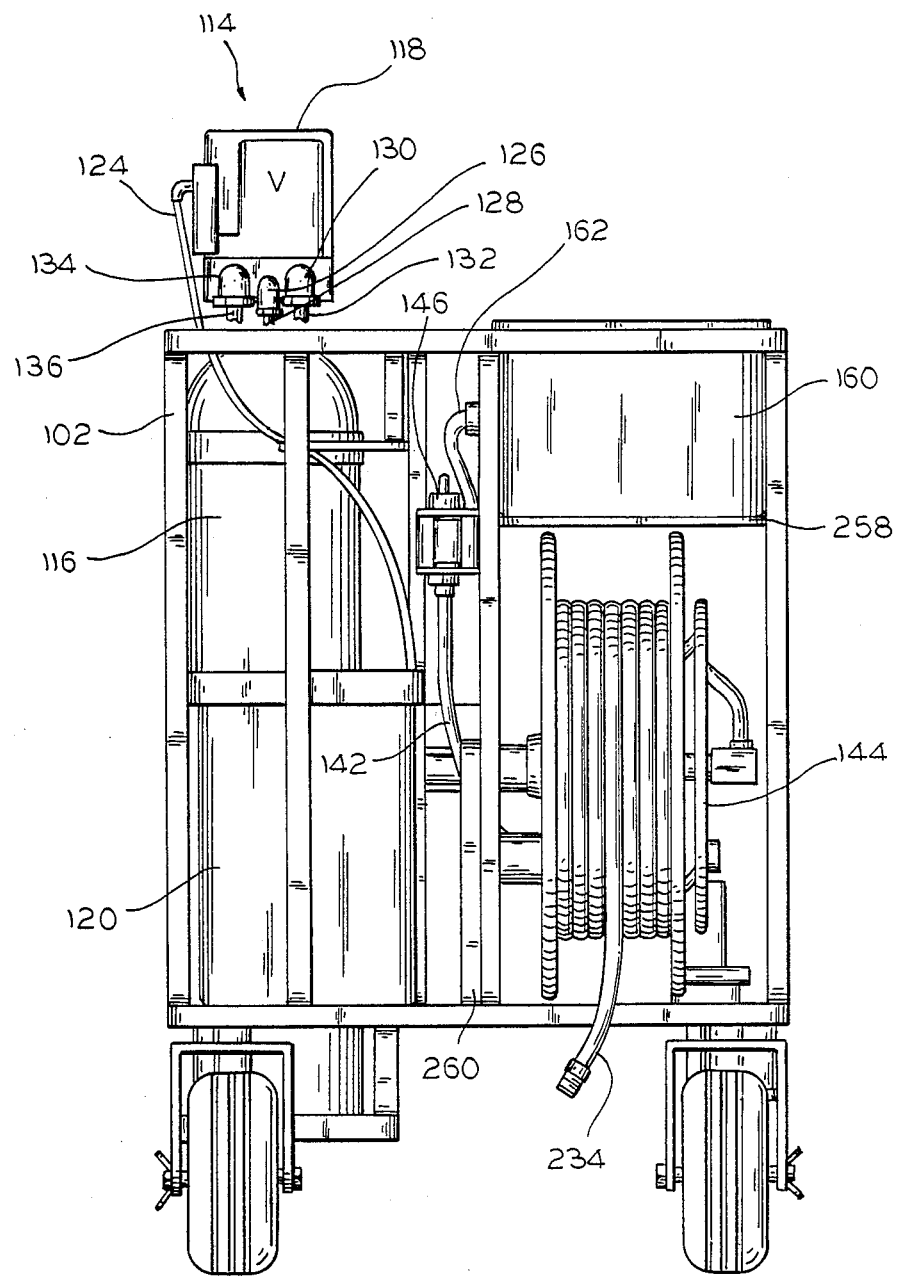
FIG. 4 is a front elevational view of the wash system of the present invention.

Referring to FIG. 4 the water softener system has an exhaust 126 with an exhaust hose 128 connected thereto; an intake 130 with an intake hose 132; and an output 134 with an output hose 136. A retaining strap 138 secures the mineral tank 116 to the cart 102.

A bypass valve unit 140 (see FIGS. 1 and 8) alternately directs water through the water softener unit 114 or bypasses the water softener unit 114 according to a switch selection by the operator. A connecting hose 142 conducts intake water from the intake hose reel to the bypass valve unit 140 near the water softener 114. The bypass valve itself 146 is a solenoid operated valve, controlled by an electrical signal 148 from the control panel 800. At the input side of the bypass valve unit is a first "T" intersection 150 which permits water to flow to both the bypass valve 146 and to the input of the water softener 114. The output of the water softener 114 is connected to the input of the check valve 152. The output of the check valve 152 and the output of the bypass valve 146 are both connected to a second "T" (see FIG. 8) intersection 154. The third port of the second "T" intersection 154 is the output of the bypass valve unit.

The check valve 152 permits water to flow only in one direction (from input to output) and opens only when the pressure at the input port is at lease 40 psi greater than the pressure at the output port. When the bypass valve 146 is closed, positive pressure supplied by the intake water supply on the input port of the check valve 152 combines with pump-supplied negative pressure at the output port of the check valve 152 to create the necessary 40 psi pressure difference and causes the check valve 152 to open. Intake water is thus permitted to flow through the water softener 114 supplying spot-free rinse water to the pump 156. When the bypass valve 146 is opened, the pressure at the input and output ports of the check valve are essentially equal, and the check valve 152 closes. In this state, water is not permitted to flow through the water softener 114 and untreated water is supplied to the pump 156.

A wax reservoir 158 (FIG. 2) and a cleaning agent reservoir 160 are mounted on upper supports of the cart and provide storage for fluids which may be introduced into the discharge stream. These reservoirs are preferably mounted side by side on the cart opposite the water softener mineral tank 116.

The car wash system 100 can introduce either or both of a cleaning agent and a wax solution into the output stream under operator control. Cleaning agent flows from its reservoir 160 through a connecting tube 162 to an operator adjustable metering valve 164 mounted near the control panel 166. The valve 164 permits cleaning agent to pass to its output port at a precise, predetermined rate, and indicates the selected rate for convenient reference. Metered cleaning agent flows from the metering valve 164 through connecting tube 168 to the cleaning agent control valve 170. The control valve 170 is a two-way direct acting solenoid operated valve, controlled by an electrical signal 172 from the control panel 166. The cleaning agent flows from the control valve 170 through connecting tube 174 to additive injector 176. Wax solution similarly flows from its reservoir 158 through connecting tube 178, metering valve 180, connecting tube 182, through its control valve 184, through connecting tube 186, and on to the additive injector 176. Wax control valve 184 is controlled by an electrical signal 188 from control panel 166. Treated or untreated water, as selected by the bypass valve unit 140 flows through a connecting tube 190, through "T" intersection 192, through additive injector 176, and on to the input port of the pump 156.

Mounted on the top rear of the cart is an electrical control panel 166 (FIG. 1A, 3 and 9) which houses switches and meters used to control the operation of the system. A "spot-free rinse/regular water" selector switch 194 selects whether softened or unsoftened water is discharged and provides an electrical signal 148 to operate the bypass valve unit 140. A soap selector switch 196 selects whether or not cleaning agent is introduced into the discharge stream and provides an electrical signal 172 to operate the cleaning agent control valve 170. A wax selector switch 198 selects whether or not wax solution is introduced into the discharge stream and provides an electrical signal 188 to operate the wax solution control valve 184. Three indicator lamps 200, 202, 204, permit the operator to determine the state of the switches 194, 196, 198 from a distance. An ammeter 206 shows the rate of charge or discharge of the battery 208. An elapsed time meter 122, operated by the electrical signal 148 from the "spot-free rinse" switch 194, shows the length of time the water softener 114 has operated. This permits the operator to determine when regeneration is necessary. An additional elapsed time meter 210 indicates the length of time the engine 212 and pump 156 have operated.

Figure 2:
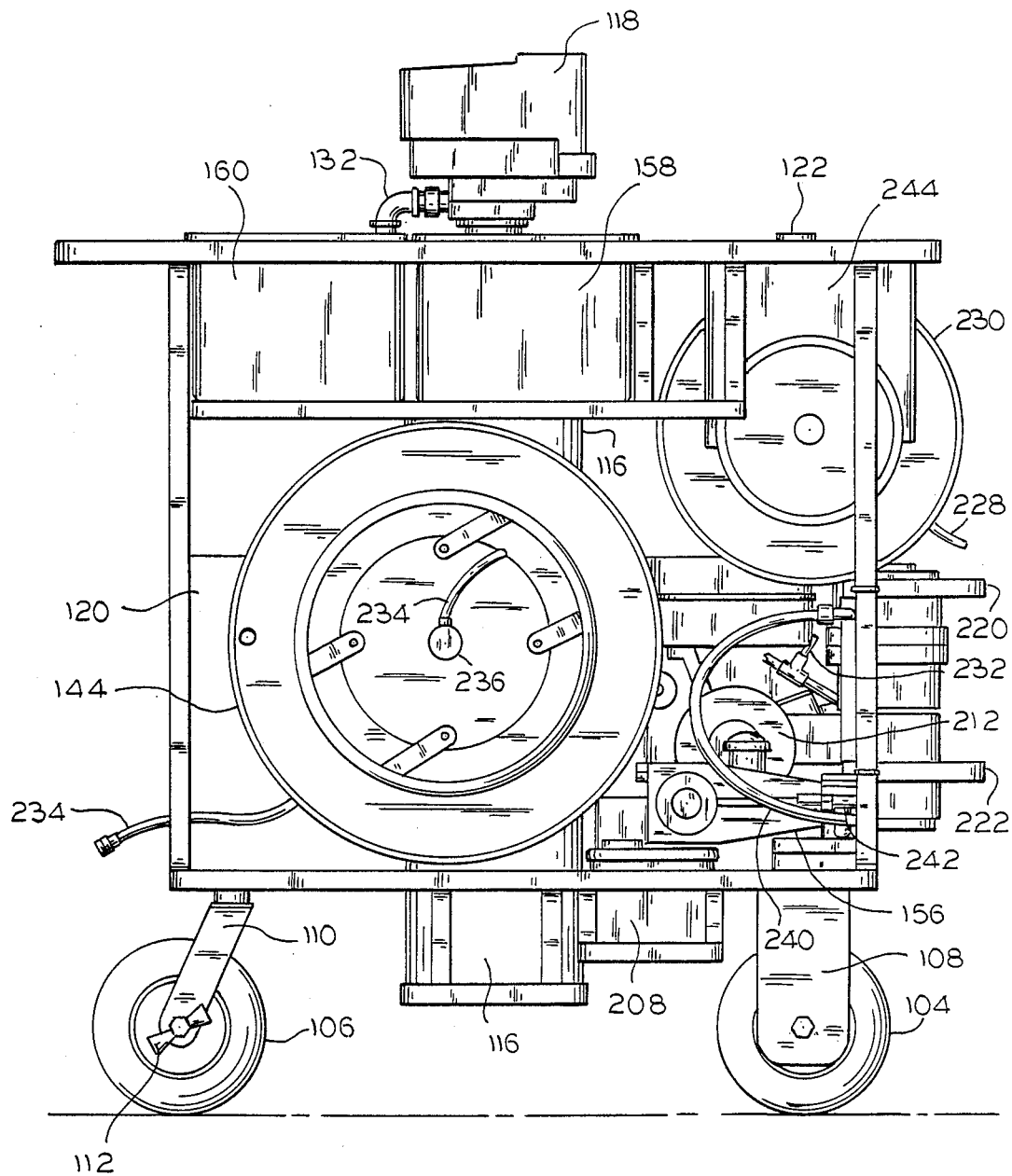
FIG. 2 is the other side view of the wash system of the present invention.

A gasoline engine 212 is mounted on the lower rear end of the cart. The engine is preferably an 8 h.p. gasoline engine having its shaft directly connected to a high pressure water pump 156 (FIG. 2). The engine may be any desired h.p. However, I have found that it should be between 5-10 h.p. As an alternative, an electric motor could be used to operate the pump 156. A pull cord 214 is used to start the engine 212, although another embodiment might use an electric starting motor for this purpose. A fuel tank 216 stores fuel for the engine. An engine control switch 218 is used to stop the engine and enable starting. The engine is bolted to the cart base by bolts.

Metal guards 220 and 222 are attached to the rear of the cart and extend therefrom to surround the engine and pump to act as bumper guards to protect the engine 212 and pump 156.

A battery 208 provides electrical power to operate various controls and indicators. A generator or magnet is provided to change the battery and to operate therewith the various electrical means, i.e., the various solenoid switches. Also, if the power plant is electrical, it can be operated by an appropriate electrical connection or by one or more batteries mounted on the cart.

A trigger activated spray gun 224 is provided. The gun has attached to the discharge end thereof a discharge wand 226. This permits the user to control and direct the pressurized discharge stream of liquid at the vehicle being washed. A discharge hose 228 connects the system to the gun 224. A discharge hose reel 230 provides convenient storage for the high pressure discharge hose 228. The outlet of the high pressure discharge hose 228 is connected to the inlet of the gun. A high pressure connecting hose 232 connects the output of the pump 156 to the inlet of discharge hose reel and high pressure discharge hose.

FIG. 1A shows a top view of one of the control panels 166. The control panel is electrically connected to the various parts indicated. There is provided a gage 206 to indicate the state of the battery-charging or discharging; a soft water elapsed time meter 122 indicates the amount of time the water softener system was in operation and informs the user when to regenerate the water softener. The panel has an on-off switch 196 and indicator light 156 for the soap, an on-off switch 198 and indicator light 156 for the wax and an on-off switch 198 and indicator light 204 for the wax and an on-off switch 194 and indicator light 200 to enable discharge of softened water. When the indicator lights are on, this indicates that the respective switch is on. When the wax and/or soap switch 198, 196 is in the on position, that means the wax and/or soap are being mixed with the water being sprayed on the car. When the soft water switch 194 is in the soft water position, water is being directed through the soft-water system 114. When the soft water switch 194 is in the regular water position, tap water is being used and the water is by-passing the soft-water system 114. A discharge hose reel 230 provides convenient storage for the high pressure discharge hose 228. The outlet of the high pressure connecting hose 232 connects the output of the pump 156 to the inlet of discharge hose reel 230 and high pressure discharge hose 228.

FIG. 2 shows a view of the car wash system 100 from the side opposite FIG. 1 with the cart turned 180°. The intake hose reel 144 is shown, including the intake hose 234, and a mechanical version of a slip ring 236 which conducts water from the intake hose 234 to the non-rotating hub of the hose reel 144. The water softener system 114 is shown along with its mineral tank 140, a timer and valve unit 118, a brine tank 120 and intake hose 132. A wax reservoir 158 mounted adjacent the cleaning agent reservoir 160. Both provide storage for their respective wax and soap liquids which may be introduced into the discharge stream. A flow restrictor 238 and connecting tube 240 conduct high-pressure water from the pump output to the pump input to permit the pump 156 to continue operation when water discharge through the spray gun 224 is disabled. The pump 156 pressurizes discharge water. The pump 156 includes a prominent valve unit 242. The engine 212 is visible behind the pump 156, and provides power to operate the pump 156. High pressure connecting hose 316 conducts discharge water from the pump 156 output to the discharge hose reel 116. Discharge hose reel 116 provides storage for the high pressure discharge hose 228. Discharge hose 228 conducts high pressure discharge water from the system to the sprayer gun 220. Metal guards 220 and 222 extend the width of the cart to protect the engine 212 and pump 156. The discharge hose reel 230 is mounted to the top of the cart by appropriate mounting bracket 244. The battery 208 as stated above provides electrical power to operate various controls and indicators.

The pump 156 pressurizes water to approximately 1500-2000 psi for discharge through a manually operated cleaning spray gun 224. The high pressure is necessary to remove dirt and grime from the vehicle being washed. The spray gun 224 has a trigger valve to permit the operator to discharge water from the wand when desired. The spray gun 224 is connected to the car wash system 100 through a discharge hose 228. A hose reel 230 provides convenient storage for the discharge hose 228. High pressure discharge water travels through a connecting tube 232 from the output port of the pump 156 to an input port on the fixed hub of the hose reel 230. Flow restrictor 238 and high pressure connecting hose 240 provide an additional return path for high pressure water from the pump output to the input stream to permit the pump 156 to continue operation when the discharge through the spray gun 224 is disabled. This return water is reintroduced at "T" intersection 192, where it is mixed with intake water and supplied to additive injector 176.

Figure 3:
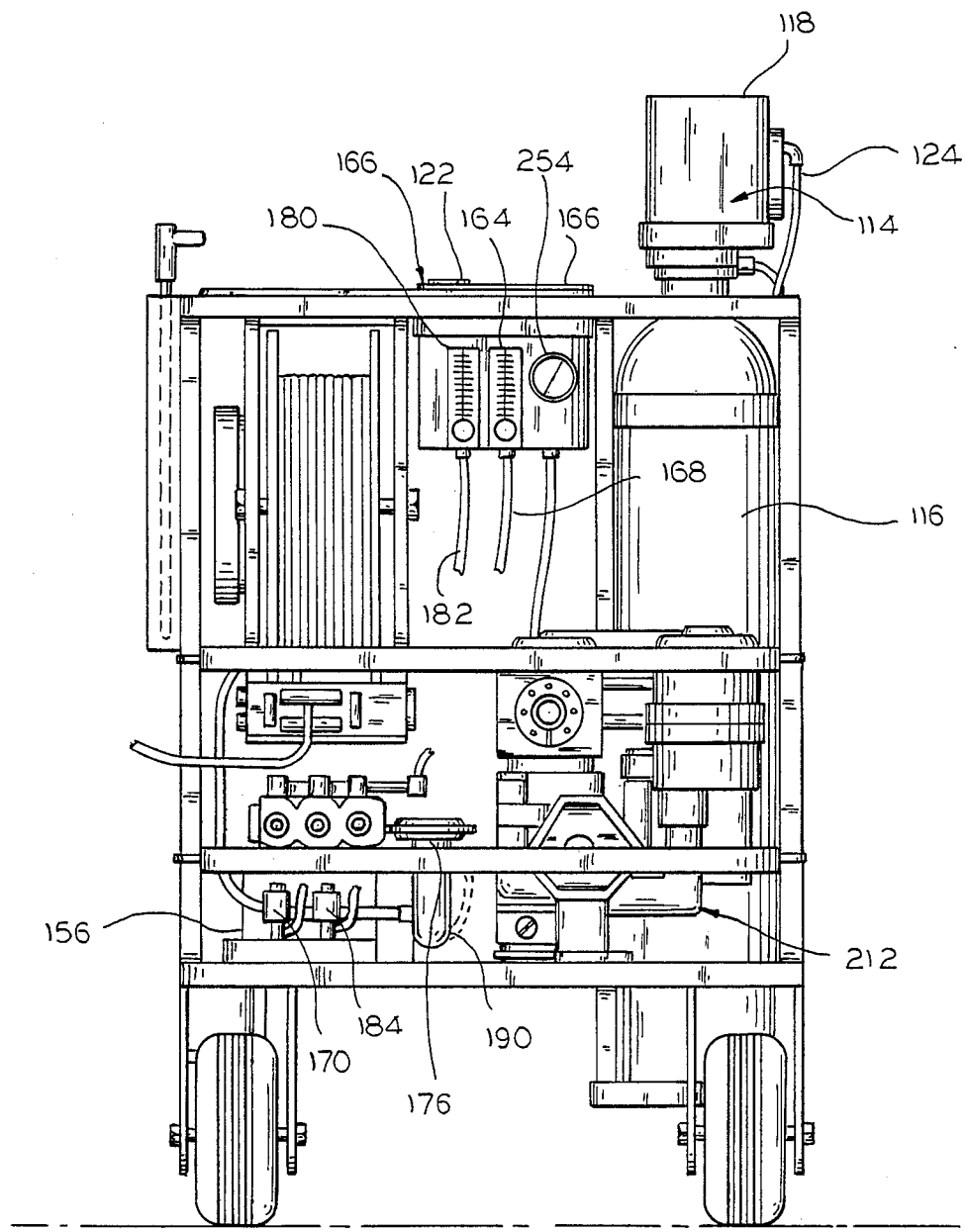
FIG. 3 is a rear elevational view of the wash system of the present invention.

In FIG. 3, there appears the water softener system 114, including valve unit 118 and mineral tank 116. The engine 212 receives air through its air intake and air cleaner 246, and discharges exhaust gasses through an exhaust muffler 248. A maintenance cover 250 provides access to internal workings of the engine 212. The pump 156 is shown. The pump is a positive displacement pump having an appropriate pressure relief mechanism and has a direct drive gear box unit. The direct drive gear box unit connect the pump via the engine shaft. The pump has a valve unit 242, and additive injector 176. Tube 190 supplies water from the bypass valve unit 140 to a "T" intersection 192. High-pressure connecting hose 240 also supplies water from flow restrictor 238 to the "T" intersection 192. The output of "T" intersection 192 is connected to the input of additive injector 176. The output of the additive injector supplies water to the intake of the pump 156. Wax control valve 184 is a two-way direct acting solenoid valve that controls the flow of wax solution through connecting hoses 182 and 186 to additive injector 176. The wax valve is appropriately electrically connected to the wax switch (FIG. 1A).

The front of the control panel which faces the rear of the cart has connected thereto the cleaning agent metering valve 164 and the wax metering valve 180. These are appropriately connected to the control valves 170 and 184. Each of the valves 170 and 184 have respective outlet hoses 174 and 186 which connects the respective valves to the additive injector 176. The additive injector 176 connects the wax and soap valves to the pump input.

High pressure connecting hose 252 connects pump pressure meter 254 located on the front of the control panel 166 to the high pressure output of the pump. The pressure of the water being delivered by the pump to the high pressure discharge hose 228 is indicated by the gauge 254 i.e. 1500 to 2000 psi. High pressure connecting hose 232 conducts water from the output of pump 156 to the discharge hose reel inlet. Discharge hose reel 230 provides storage for the discharge hose 228, and grommet 256 protects the hose 228 from chafing as it is wound on or off the reel 116. The guards 220 and 216 which protect the engine 212 and pump 156 extend the width of the cart and are attached to the end posts. They are appropriately spaced from each other. Battery 208 is mounted below the pump and provides power for operation of various controls and indicators.

In FIG. 4, the water softener unit 114 appears, including its timer and valve unit 118, mineral tank 116, and brine tank 120. A brine intake hose 124 supplies brine solution from the brine tank 120 to the water softener. Water softener input 130 and output 134 are connected to appropriate places in the bypass valve unit 140. The visible portion of the bypass valve unit 140 is the bypass valve itself 146. The cleaning agent reservoir 160 is shown mounted on a shelf support 258. The wax reservoir 158 is hidden behind the cleaning agent reservoir 160. Hose 162 connects the cleaning agent reservoir to the cleaning agent metering valve 164 (not shown). The system receives fresh water through intake hose 234, which hose is stored on the intake hose reel 144. Connecting hose conducts water from the intake hose reel 144 to input of the bypass valve unit 140.

The hose reel 144 is mounted on the cart by upwardly extending frame 260 and an appropriate bracket (not shown) attached to the reel.

FIG. 5 shows a corner view of a cart 102 constructed in accordance with the present invention. The cart 102 is made primarily of tubular metal structural elements which form an essentially rectangular cube. FIGS. 6 and 7 are schematic diagrams showing a plan top view of the layout of the top portion of the cart and the base portion of the cart. A first group of longitudinal and cross members forms a substantially rectangular, planar upper deck 262, and a second group of longitudinal and cross members forms a substantially rectangular, planar lower deck 264. A third group of vertical structural elements 320 connect the upper deck 262 to the lower deck 264 at corners of the rectangular decks and at intermediate points on the outer boundaries of the decks.

The external boundaries of the upper deck 262 are defined by cross members 268 and 270 and longitudinal members 272 and 274, which are connected to form a rectangle. Cross member 276 connects 272 and 274 at an intermediate position between 268 and 270. Longitudinal member 278 connects 268 and 276 at an intermediate position between 272 and 274. Cross member 280 connects 272 and 278 at a intermediate position between 276 and 268. Cross member 282 connects 278 and 274 at an intermediate position between 268 and 276. Cross member 284 connects 278 and 274 at an intermediate position between 282 and 276. Longitudinal member 286 connects 268 and 280 at an intermediate position between 278 and 272.

The external boundaries of the lower deck 264 are defined by cross members 288 and 290 and longitudinal members 292 and 294, which are connected to form a rectangle. Cross member 296 connects 292 and 294 at an intermediate position between 288 and 290. Longitudinal member 298 connects 290 and 296 at an intermediate position between 292 and 294. Longitudinal member 300 connects 296 and 288 at an intermediate position between 292 and 298. Cross member 302 connects 292 and 300 at an intermediate position between 288 and 296. Cross member 304 connects 300 and 294 at an intermediate position between 302 and 296. Longitudinal member 306 connects 288 and 304 at an intermediate position between 294 and 300. Cross member 308 connects 294 and 306 at an intermediate position between 288 and 304. Longitudinal member 310 connects 290 and 296 at an intermediate position between 294 and 298. Cross member 312 connects 294 and 310 at an intermediate position between 290 and 296. Cross member 314 connects 292 and 298 at an intermediate position between 290 and 296. Longitudinal member 316 connects 314 and 296 at an intermediate position between 292 and 298. Longitudinal member 318 connects 302 and 296 at an intermediate position between 300 and 316.

The boundaries of the cart are further defined by the vertical structural elements 320 which connect the upper deck 262 with the lower deck at corners and certain intermediate points. Vertical element 322 connects upper deck 262 at the intersection of 268 and 274 with the lower deck 264 at the intersection of 294 and 290. Vertical element 324 connects upper deck 262 at the intersection of 270 and 274 with the lower deck 264 at the intersection of 288 and 294. Vertical element 326 connects upper deck 262 at the intersection of 272 and 270 with the lower deck 264 at the intersection of 292 and 288. Vertical element 328 connects upper deck 262 at the intersection of 268 and 272 with the lower deck 264 at the intersection of 292 and 290. Vertical element 330 connects 276 at an intermediate point between 324 and 278 with 288 at the intersection of 288 and 306. Vertical element 332 connects 276 at an intermediate point between 703 and the intersection of 276 and 278 with 288 at an intermediate point between 326 and the intersection of 288 and 300. Vertical element 334 connects 274 at an intermediate point between the intersection of 274 and 282 and the intersection of 274 and 284 with 294 at an intermediate point between the intersection of 294 and 296 and the intersection 294 and 304. Vertical element 336 connects 278 at an intermediate point between the intersection of 278 and 282 and the intersection of 278 and 284 with 300 at an intermediate point between the intersection of 300 and 296 and the intersection of 300 and 304.

In addition to the general structural elements previously described, the cart also includes a number of shelves, platforms, and other structures which facilitate mounting and retention of the active components of the car wash system.

A horizontal mounting platform 258 holds the wax reservoir 158 and the cleaning agent reservoir 160. The platform is located about 12 inches below the upper deck 262 and is attached to vertical structural members 326 and 332 and to vertical support members 338 and 340. Vertical support member 338 extends downward from the upper deck 262 at the intersection of 272 and 280. Vertical support member 340 extends downward from the upper deck 262 from 280 at an intermediate position between 338 and the intersection of 280 and 278. Vertical retaining members 342, 344, 346, and 348 extend upward from the end of the platform closest to 280 to secure reservoirs 158 and 160.

Appropriate mounts are used to hold the control panel 166 to the upper deck support members 286, 280 and 278.

A rectangular metal shelf 350, located about 6 inches below the upper deck 262, is used to hold various items desired i.e. indoor window sprays, clothes etc. Shelf 350 is supported by vertical support elements 352 and 354. Element 352 extends downward from 284 near the intersection of 284 and 278. Element 354 extends downward from 276 near the intersection of 276 and 278.

A platform 356 about 8 inches below the lower deck 264 holds the battery 208. Platform 356 is supported by vertical support elements 358, 360, 362, and 364. Elements 358 and 360 extend downward from 296 at intermediate positions between 292 and 316. Elements 362 and 364 extend downward from 314 at intermediate positions between 292 and 316.

A platform 366 about 8 inches below the lower deck 264 holds the base of the water softener mineral tank 116. Platform 366 is supported bY vertical support elements 368, 370, 372, and 374. Element 368 extends downward from 300 at an intermediate position between 336 and the intersection of 300 and 296. Element 370 extends downward from 300 at an intermediate position between 336 and the intersection of 300 and 304. Elements 372 and 374 extend downward from 294 at intermediate positions between 334 and the intersection of 294 and 296.

A rectangular-U-shaped support structure 260 supports the intake hose reel 144. The U-support 260 extends upward from 318 at intermediate positions between 296 and 302. A bracket on the intake hose reel 144 is attached to the vertical portions of the U-support 260 with bolts.

As stated above, this invention is a mobile system for washing vehicles. It supplies water, possibly laden with wax or a cleaning agent, at high pressure, to a dispensing wand. A high pressure flexible hose connects the wand to the system. The wand contains a trigger-operated valve to permit the user to control the flow of water from the wand.

The system contains a self regenerating water softener unit to provide softened water for rinsing the vehicle after washing to allow the vehicle to dry spot-free by exposure to air.

The system includes a pump to pressurize the liquid to be dispensed. A gasoline engine or electric motor supplies power to operate the pump. A storage battery or batteries provide electrical power to start the gasoline engine and to operate with the generator or magnetic various electrical control circuits essential to the operation of the system.

The system contains reservoirs for wax and a cleaning agent. By means of switches, the user may control whether or not wax or cleaning agents are introduced into the stream of water dispensed by the spray gun. The user may also control whether softened or unsoftened water is dispensed.

The system provides indicators to display the pressure of the water supplied by the pump, the rate of charge or discharge of the battery or batteries, the rate at which wax or cleaning agent is introduced into the dispensed liquid, and the elapsed time during which the water softener has operated. The system requires a supply of fresh water, and it receives this water through an intake hose. The system includes two hose reels for convenient storage of the intake and dispensing hoses.

The entire system is mounted on a wheeled cart so that it can be conveniently moved from vehicle to vehicle by the operator.

Figure 8:
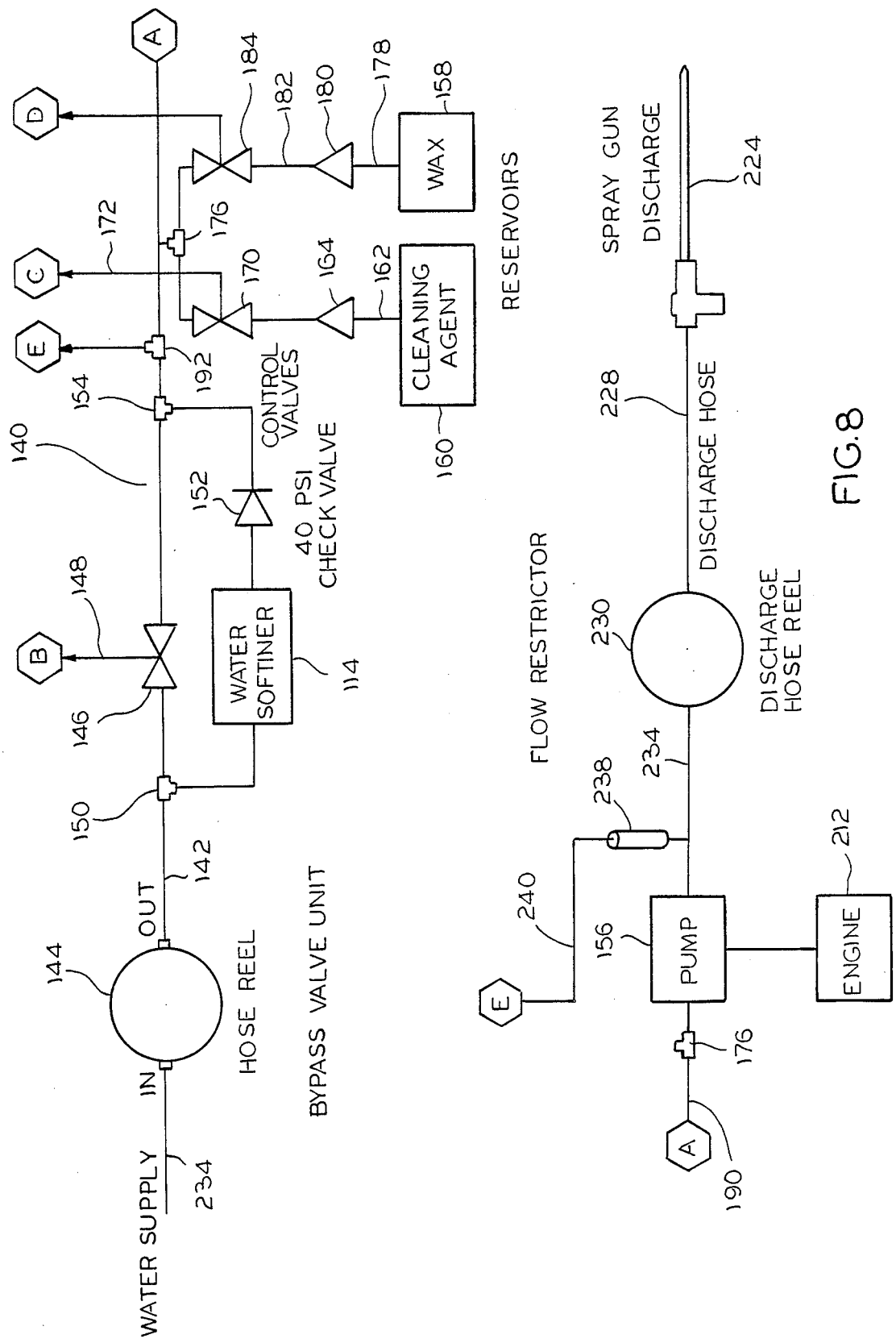
FIG. 8 is a schematic diagram showing the flow of liquid through the system.
Figure 9:
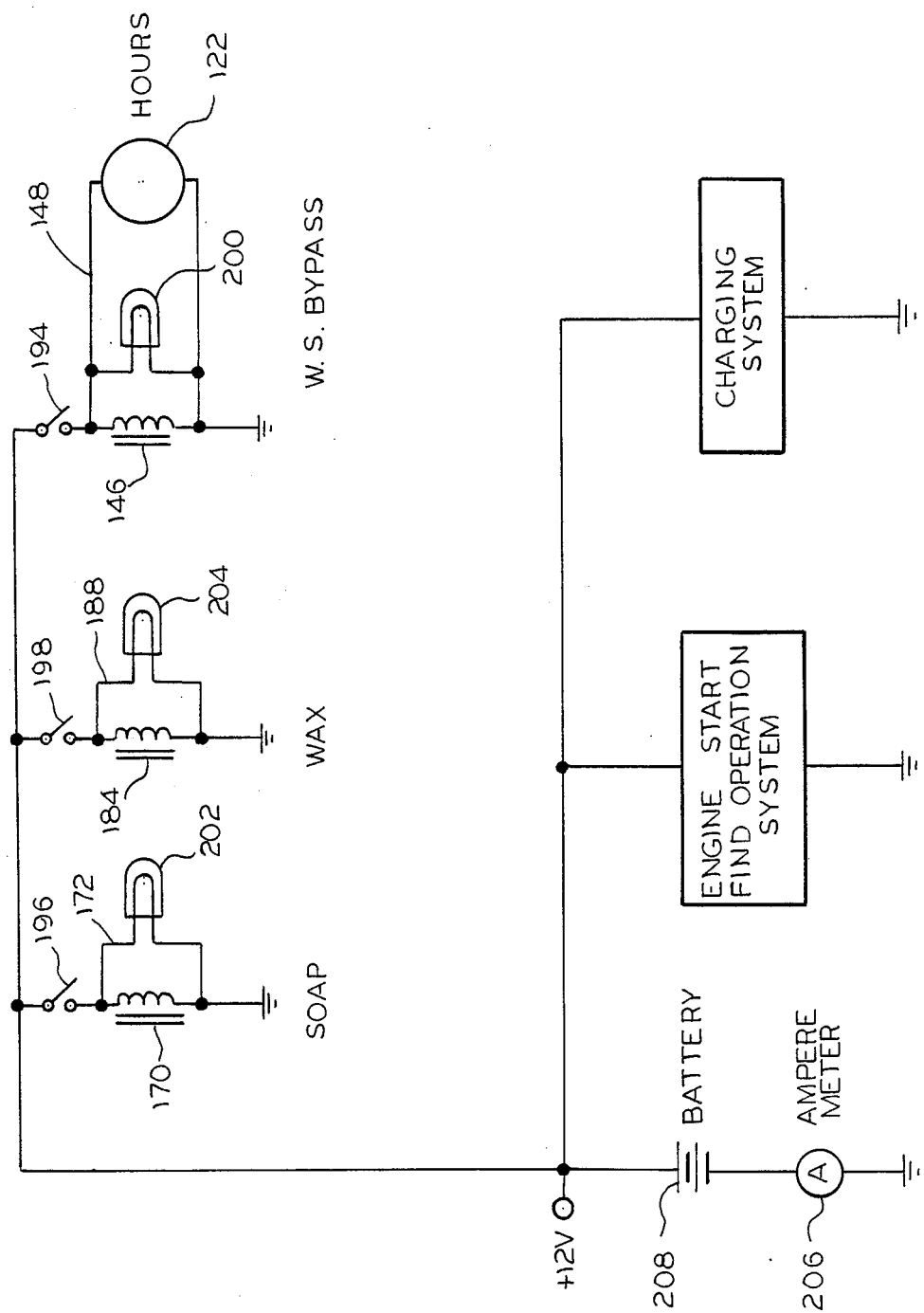
FIG. 9 is an electrical schematic diagram.

Referring to FIGS. 8 and 9 the operation of the car wash system and the controls are schematically illustrated. In operation, the car wash system 100 receives a source of fresh water through an intake hose 234. The fresh water may come from a municipal water supply, well or other domestic water source. A hose reel 144 provides convenient storage for the intake hose 234. It is normal for some portion of the intake hose 234 to remain wound on its storage reel 144 while the system 100 is in operation. The intake hose 234 is connected to a fitting (not shown) on the moveable part of the hose reel 144, and a mechanical version of a slip ring conducts water to an output port on the fixed hub of the reel. In a known manner this is connected to the hose 234. The water softening unit 114 supplies demineralized water for rinsing vehicles.

A bypass valve unit 140 alternately directs water through the water softener unit 114 or bypasses the water softener unit 114 according to a switch selection by the operator. The softened water is preferably used when the vehicle is being washed and having its final rinse with wax if desired.

The car wash system 100 introduces either the cleaning agent or the wax into the output stream under operator control through the respective soap valve 170 or wax valve 184.

The pump 156 pressurizes water to approximately 1500-2000 psi for discharge through the manually operated spray gun 224. The high pressure is necessary to remove dirt and grime from the vehicle being washed. The spray gun 224 has a trigger valve to permit the operator to discharge water from the wand when desired. Thus a vehicle may be cleaned and waxed with my mobile washing system.

I claim:

1. A mobile vehicle wash system mounted on a mobile cart with four wheels, said system comprising:
   regenerating water softener means having a mineral tank coupled to receive untreated water and to deliver softened water, a bring tank connected to said water softener means for supplying a regenerating chemical to the mineral tank, and control means connected to said water softener means for supplying either untreated water or the regenerating chemical to the mineral tank in a predetermined sequence;

a water supply hose connected through a water supply hose reel to said water softener means;

a liquid wax reservoir for supplying wax to softened water delivered by said system;

a liquid cleaning agent reservoir for supplying said cleaning agent to said softened water delivered by said system;

a high pressure liquid pump coupled to drive water through said system;

engine means coupled to operate said pump;

a high pressure reel means connected to said pump to deliver high pressure liquid to said high pressure reel;

a high pressure hose connected to said high pressure reel;

a high pressure spray gun connected to said high pressure hose to deliver high pressure water onto a vehicle to be washed;

a first valve means for selectively connecting the high pressure pump to either the water supply reel or the mineral tank for supplying either untreated water or softened water to the high pressure pump;

means for selectively connecting the wax reservoir to supply wax to the water being supplied to the pump;

means for selectively connecting the cleaning agent reservoir to supply a cleaning agent to the water being supplied to the pump; and battery powered means to operate at least one of the selective means for supplying said wax and said liquid cleaning agent.

2. The mobile vehicle wash system of claim 1 wherein: the four wheels have four pneumatic tires; the first valve means being a solenoid-activated valve; each of the means for selectively connecting the wax and cleaning agent reservoirs including a solenoid-activated valve, a manually operated on-off switch coupled to control said solenoid activated valve, a light coupled to indicate the on-off state of said switch, and a metering valve means coupled to supply a predetermined amount of wax and cleaning agent respectively to the water being supplied by the pump when the switch is on; and said pump being a gear-operated pump connected directly to an engine shaft.

3. The mobile vehicle wash system of claim 2 wherein said engine is between 5 and 10 h.p. and the pump supplies liquid to the high pressure hose at between 1,200 and 2,000 psi.

* * * * *